United States Patent [19]

Klossner et al.

[11] Patent Number: 5,240,085
[45] Date of Patent: Aug. 31, 1993

[54] IMPLEMENT COUPLER STRUCTURE

[75] Inventors: David E. Klossner, Juneau; Curtis R. Bening, Burnett, both of Wis.; Steven L. Schmid, Agency; Larry D. Hining, Ottumwa, both of Iowa

[73] Assignee: Deere & Company, Moline, Ill.

[21] Appl. No.: 874,145

[22] Filed: Apr. 27, 1992

[51] Int. Cl.$^5$ .............................................. B60K 17/28
[52] U.S. Cl. .................... 180/53.1; 180/53.7; 172/98; 15/82
[58] Field of Search ............ 180/53.1, 53.3, 53.6, 180/53.7, 53.8, 14.2, 14.1; 172/98, 99, 107, 273; 15/82

[56] References Cited

U.S. PATENT DOCUMENTS

| | | | |
|---|---|---|---|
| 2,548,676 | 4/1951 | Milz et al. | 15/82 |
| 3,071,793 | 1/1963 | Lull | 15/82 |
| 4,076,080 | 2/1978 | Anderson | 172/804 |
| 4,111,273 | 9/1978 | Blackburn et al. | 180/14.1 |
| 4,778,195 | 10/1988 | Vachon | 280/477 |
| 5,058,685 | 10/1991 | Moffitt | 172/820 |
| 5,060,463 | 10/1991 | Jones | 56/15.9 |
| 5,082,065 | 1/1992 | Fletcher | 172/273 |

FOREIGN PATENT DOCUMENTS 1257784 2/1961 France .................................. 172/98

OTHER PUBLICATIONS

"John Deere 54 Front Blade (Ser. No. 13,277-)" Operator's Manual OM-M46643, Issue H1, Deere & Company, 14 pages, published in U.S.A., Sep. 1971.
Parts Catalog for "54-Inch Front Blades", Deere & Company, 28 pages, published in U.S.A., Nov. 1985.

Primary Examiner—Margaret A. Focarino
Assistant Examiner—Paul Dickson

[57] ABSTRACT

A quick coupler for mounting a variety of implements to a vehicle, such as a lawn and garden tractor, is provided. The coupler easily mounts on the vehicle and receives powered or non-powered implements. The coupler includes pivot structure and hydraulic actuators to allow it swinging movement about a horizontal axis or the implement angling movement about a vertical axis. Interference between the coupler structure and drive line of the vehicle is eliminated as the coupler or implement is swung about their respective axes by positioning the angling cylinder below the PTO drive line and locating it between two coupler frame plates.

11 Claims, 4 Drawing Sheets

IMPLEMENT COUPLER STRUCTURE

FIELD OF THE INVENTION

The present invention relates to an implement coupler for attaching a variety of implements to tractors and more particularly to a coupling device which can be used both with implements that are and that are not driven by the PTO of the tractor.

BACKGROUND OF THE INVENTION

Vehicles such as lawn and garden tractors are often utilized with a variety of implements to perform various tasks. For example, they are used with blades to grade dirt or plow snow, with brushes to clean parking lots and sidewalks and with snowblowers to clean driveways, sidewalks and streets. The latter two types of implements require power to rotate the brush and the snowblower blade or auger. Typically this power is supplied by the PTO of a tractor.

Typical quick coupling devices provide for quick and easy coupling of the device to the tractor and of the implement to the coupler. The couplers are also provided with hydraulic actuators to swing the coupler about a horizontal axis and the implement about a vertical axis to manipulate the implement during its operation.

In utilizing such couplers with implements requiring PTO driving power, structural interference problems can occur between the coupler structure and the PTO drive shaft as the implement is swung about its vertical axis with the coupler or about its horizontal axis with the implement. Specifically, interference can occur between the hydraulic angling cylinder and the PTO drive shaft.

When an operator wants to change the implement being utilized with the tractor, time and cost would be saved if he did not have to provide a separate coupling device to attach driven or non-driven implements to the tractor.

SUMMARY OF THE INVENTION

In an attempt to overcome these problems, there is provided a coupling structure in which interference between the power take-off drive line extending between the tractor and the implement and the angling cylinder carried by the coupler is eliminated. This interference, which can occur as the implement is angled during use or floats relative to the vehicle as uneven terrain is encountered is eliminated through vertically separating the angling cylinder from the center line of the PTO and by enclosing the cylinder within the framework of the coupler structure.

Through locating the angling cylinder in a lower plane and enclosing it in the coupler framework, the coupler and the angling cylinder can be utilized for both implements driven by the PTO and those not driven by the PTO.

DESCRIPTION OF THE PREFERRED EMBODIMENT

Figure 1:
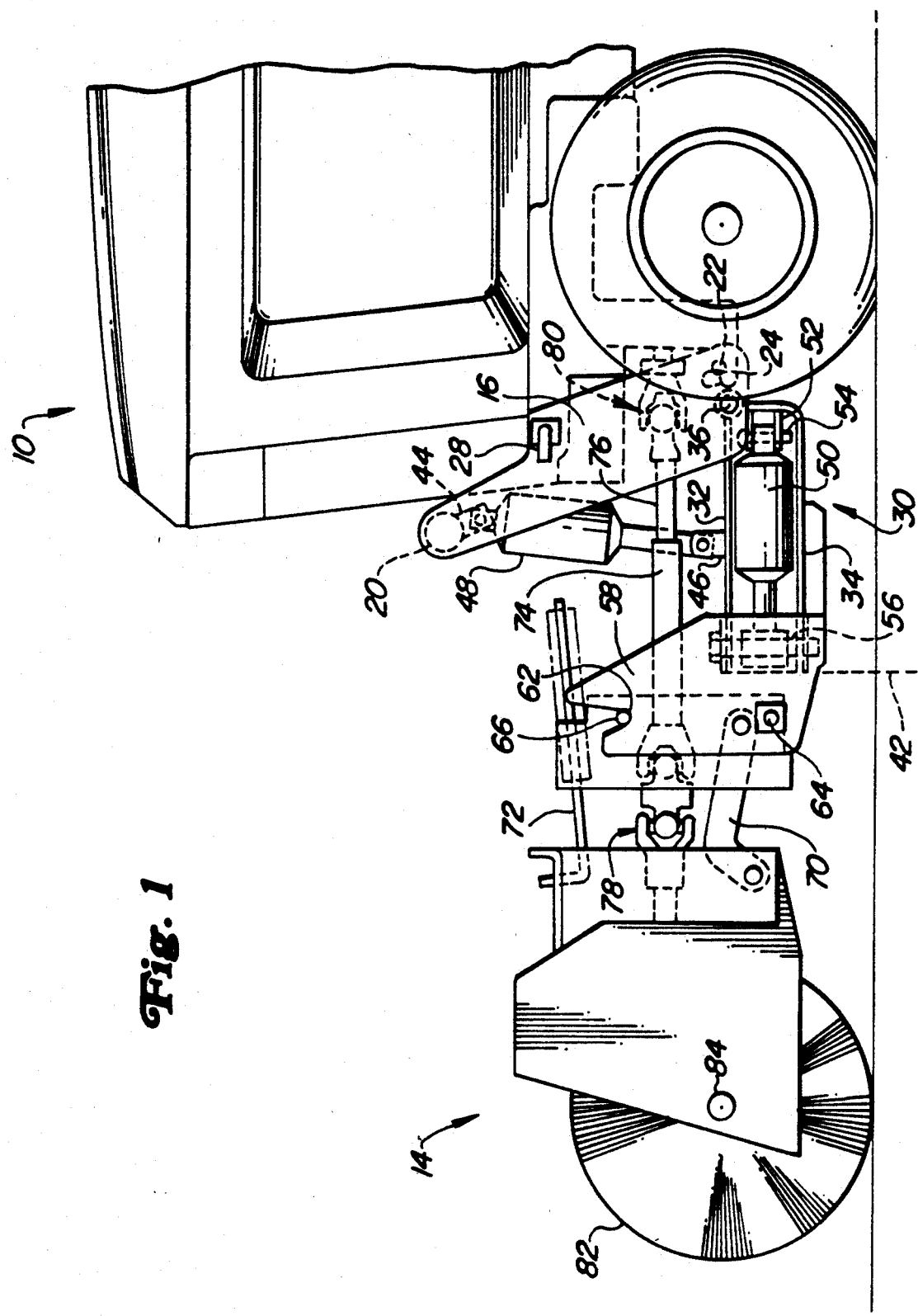
FIG. 1 is a side elevational view of the front end of a lawn and garden tractor, the coupling device and a broom implement carried on the front of the coupling device.
Figure 2:
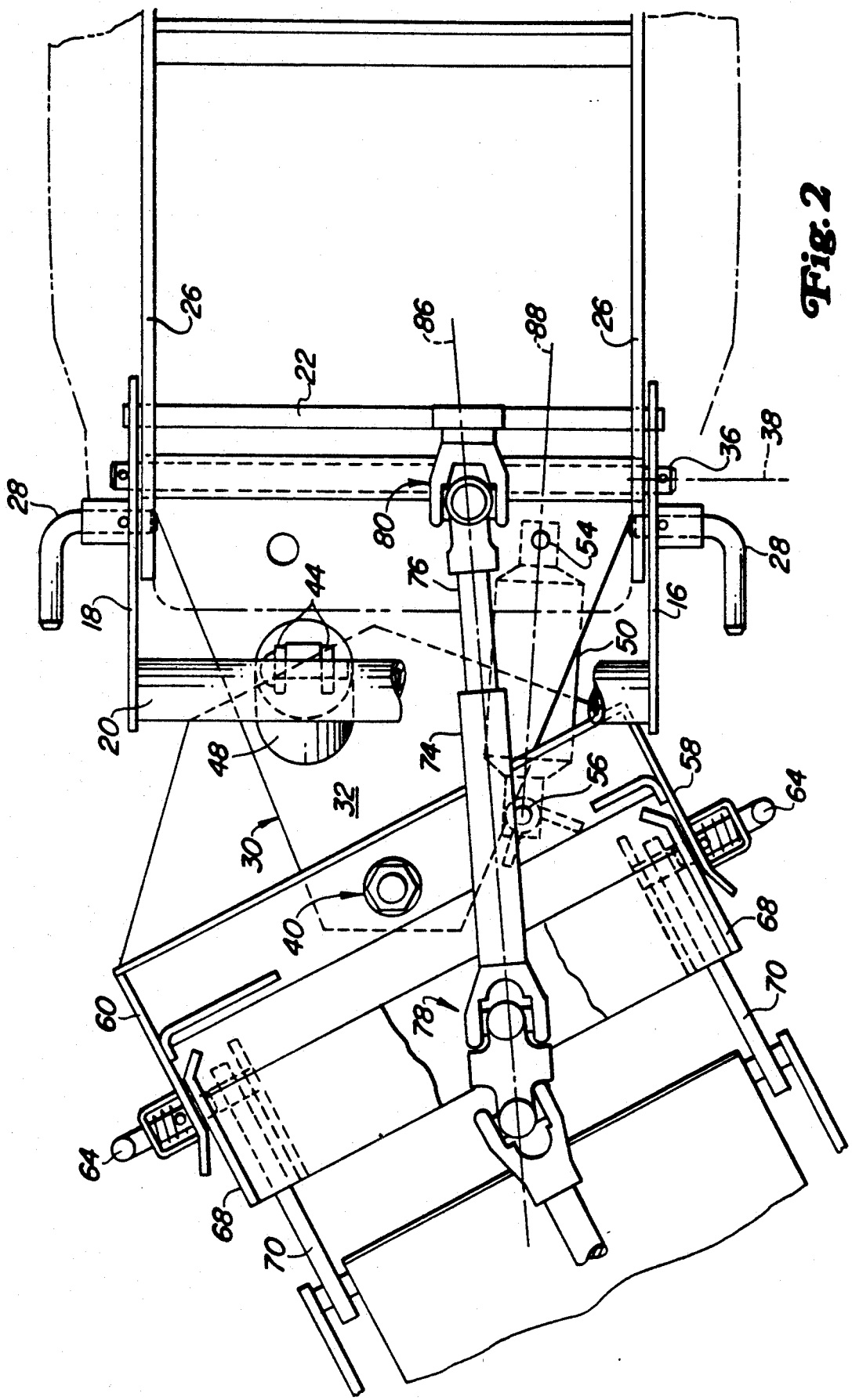
FIG. 2 is a plan view showing a front portion of the tractor, the coupling device and the PTO driven connection to the broom implement carried on the front of the coupling device.

Looking first to FIGS. 1 and 2, there is illustrated a lawn and garden tractor 10 to which an implement coupling device 12 and broom 14 is attached. At the front end of the coupler or coupling device 12, the broom 14 is supported for up and down movement. While a driven broom is illustrated, a driven snowblower or non-driven implement, such as a blade, could be attached to the coupler 12.

The coupler 12 includes at its rearwardly portion a tractor support structure which provides for quickly connecting it to or disconnecting it from the vehicle 10. The support structure includes left and right upstanding side plates 16 and 18 which carry a first upper 20 and a second lower 22 transversely extending bar between them. The lower bar 22 is received in slotted openings 24 provided in the upstanding mounting plates 26 which are fixed to and carried on each side of the tractor 10. A spring loaded pin 28 is carried in each side plate 16-18 and seats in openings provided in each upstanding mounting plate 26. Mounting of the coupler 12 on the tractor 10 simply requires that the lower bar 22 be positioned in the slots, the side plates 16-18 then rotated rearwardly to allow the spring loaded pins 28 to seat into the openings in the mounting plates 26.

The coupler 12 further includes a frame 30 composed primarily of a pair of horizontally extending and vertically spaced apart plates 32 and 34 fixed together. They are connected at their rear ends to a means for pivotally mounting the device 12, taking the form of pivot rod 36 for swinging about a horizontal transverse axis 38. This frame 30 carries at its forward end a means for pivotally mounting the implement or vertical pivot structure 40 having a vertical axis 42 through which the front of the coupler and the implement are swingably connected.

The frame 30 also includes upper and lower mounting brackets 44 and 46 for securing the hydraulic tilting cylinder 48 used to swing the frame 30 about its horizontal axis 38. The base end of the tilting cylinder 48 is coupled to brackets 44 which are carried on the upper bar 20 that extends between the side plates 16-18 The rod end of the cylinder 48 is connected to the lower pair of brackets 46 carried on the upper plate 32.

A hydraulic cylinder means or angling cylinder 50 is carried in a sandwiched position between the frame plates 32 and 34 to protect it from damage and yet allow service access and is connected at its base end to a bracket 52 by pin 54. The ram end of the cylinder 50 is connected to the front end of the coupler 12 by the pin 56. This cylinder 50 can be used to swingably move the front end of the coupler 12 and thus the implement to the right or left about the vertical axis 42. Through sandwiching the cylinder 50 between the plates 32-34, sufficient space in the drive line area is provided to allow the operator room to install, adjust and remove the drive line sleeve 74 and spline shaft 76.

The coupler 12 includes at its forward end a pair of spaced apart vertical plates 58 and 60, each having at their upper end a slot 60, and at their lower portions spring loaded pins 64. As illustrated in FIGS. 1 and 2, the implement 14 can be coupled to the device 12 by first seating since the angling cylinder 50 is located in the same horizontal plane as the vertical pivot 40, the moment arm between its line of force and the pivot assembly 42 is substantially horizontal and twisting or torque forces will be minimized as it swings the implement 14 about the pivot 40, the slots 60 beneath the laterally extending pair of spaced apart pins 66 carried by the implement 14. The lower portion of the coupler 12 can then be rotated forwardly about the pins 66 to snap the spring loaded pins 64 into openings provided in the vertical mounting plates 68 carried by the implement 12.

To permit the broom 14 to ride over uneven terrain relative to the coupler 12, a swinging coupler link 70 connects it at each of its lateral sides to the front portion of the coupler 14. A spring loaded pin 72 at the top portion allows the implement 14 to flex relative to the lower link connections 70, the flexing further being facilitated by a telescoping PTO shaft, including a sleeve 74 and spline shaft 76 extending between the broom drive connection 78 and tractor PTO drive 80. The telescoping PTO shaft is driven by the tractor PTO drive 80.

The broom implement 14 illustrated carries a laterally extending flexible broom 82 at its front end adapted for rotation about the transverse shaft 84.

Figure 3:
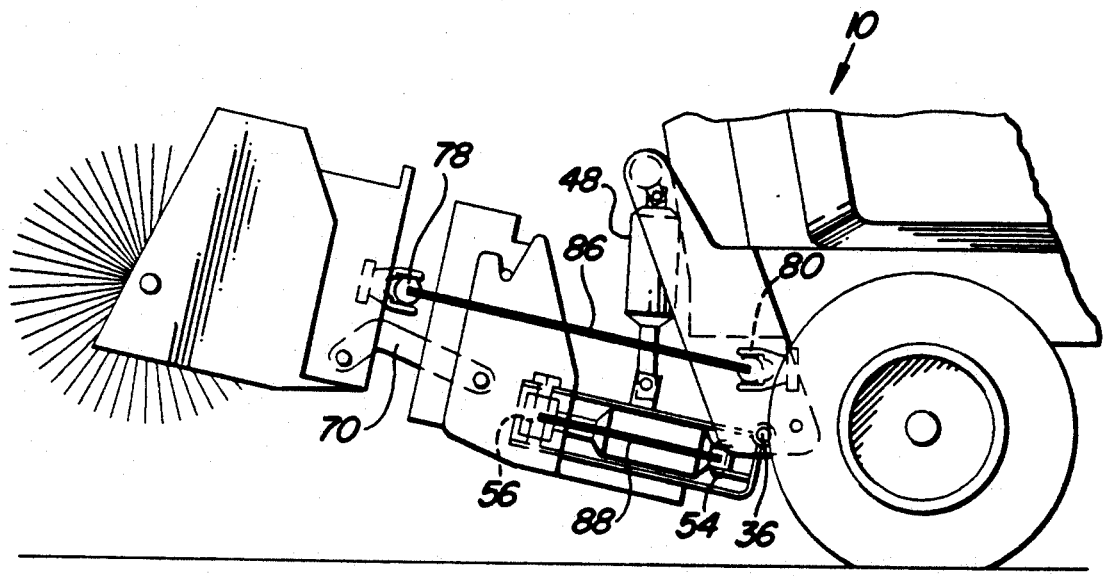
FIGS. 3 is a side view of a tractor, coupler and driven broom implement illustrating the center lines of the coupler and implement when they are in their elevated position.
Figure 4:
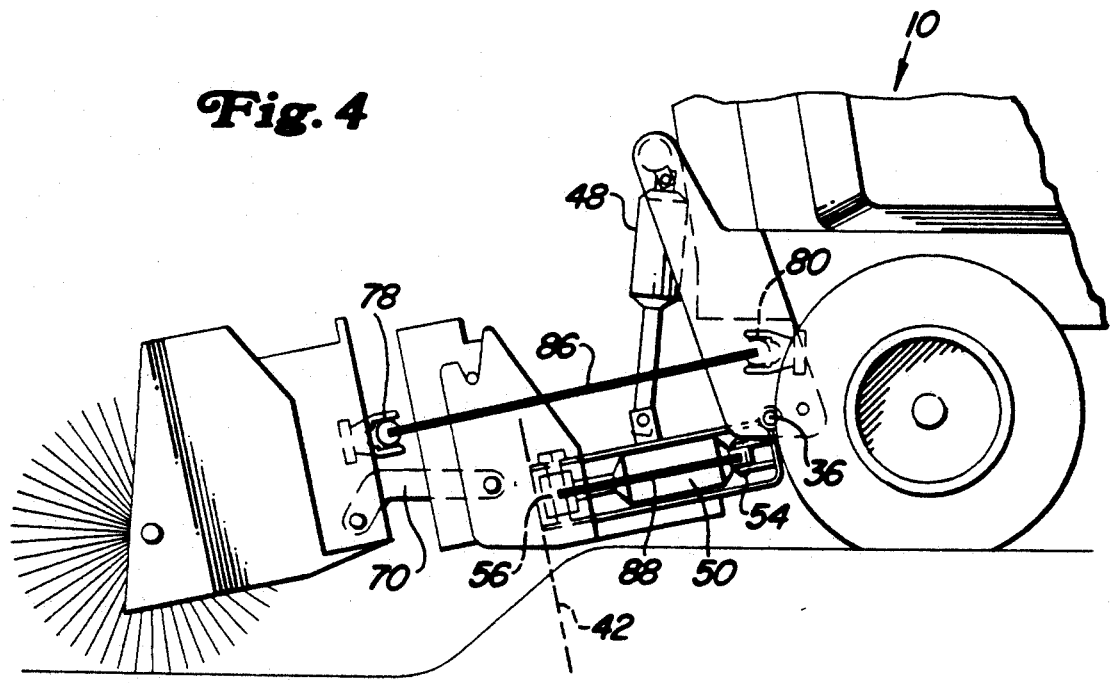
FIG. 4 is a side view of a tractor, coupler and driven implement illustrating the coupler and implement when in its lowered position.

Turning now to FIGS. 3 through 6, there are shown side and plan views illustrating the relationship between the PTO drive line comprised of sleeve 74 and shaft 76 and the angling cylinder 50. Looking first to FIG. 3, the center line extending between the drive coupling connections 78 and 80 of the tractor 10 and implement 14 and the hydraulic angling cylinder anchors 54 and 56 are shown. These center lines are designated by the numbers 86 and 88, respectively. As is illustrated in FIGS. 3 and 4, the center lines 86 and 88 between the angling cylinder 50 and PTO drive 74-76 remain substantially parallel as the implement 14 is raised relative to the tractor 10 or lowered relative to the tractor 10. By locating the horizontal axis 38 about which the angling cylinder 50 swings substantially vertically below the PTO drive coupling 80 on the tractor 10, by positioning the anchor point 54 of the cylinder 50 closely adjacent this horizontal axis 38, the hydraulic cylinder 50 below the PTO drive line 74-76 initially and orienting it generally parallel to the PTO drive line 74-76, the parallel non-interfering relationship between the drive line 74-76 and angled cylinder 50 is maintained. By locating, mounting and positioning the cylinder 50 and its attaching structure, between the plates 32 and 34 of the framework of the coupler 12, interference between the hydraulic cylinder 50 and PTO drive line 74-76 is eliminated.

Figure 5:
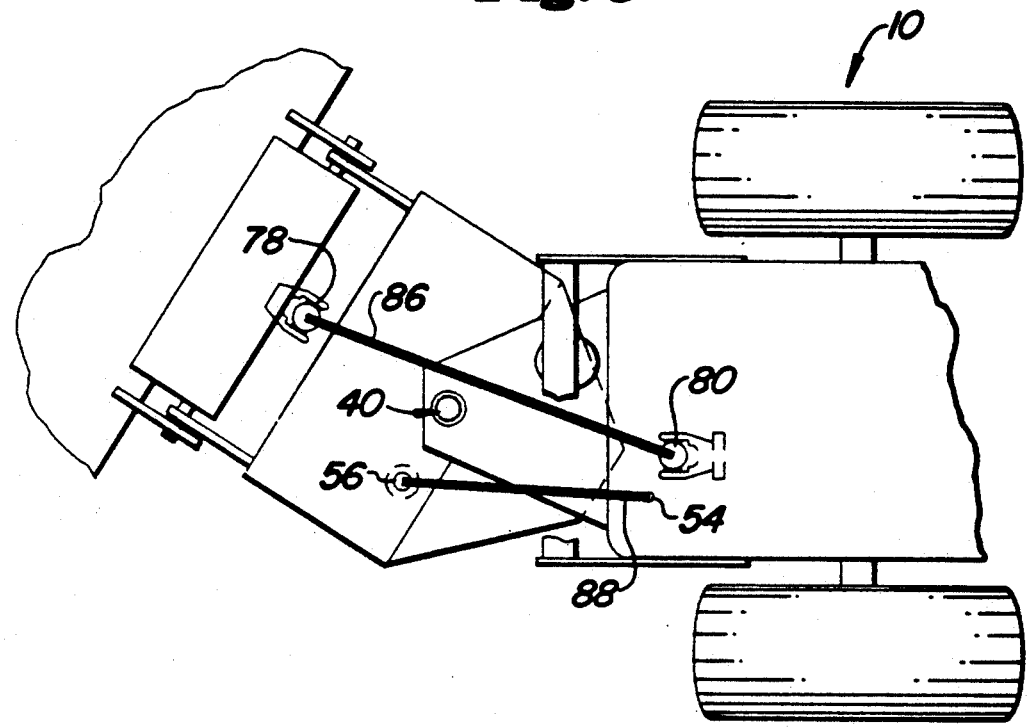
FIGS. 5 is a plan view of a tractor, coupler and driven broom implement illustrating the center lines of the angling cylinder and PTO when the implement and coupler are in a rightwardly angled position.
Figure 6:
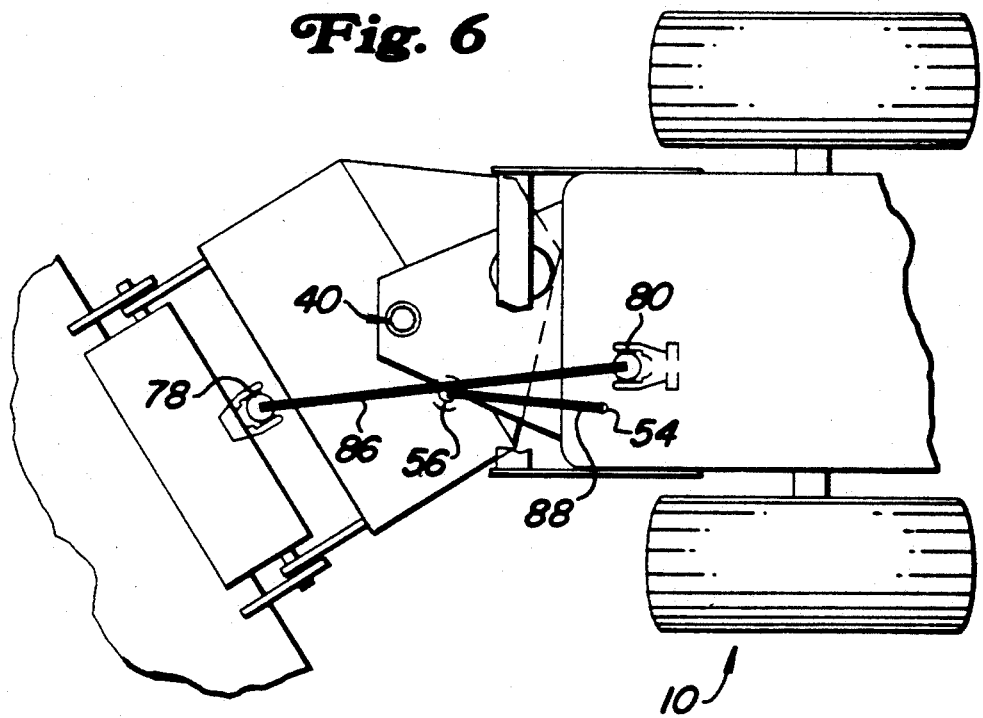
FIG. 6 is a plan view similar to FIG. 5 but illustrating the coupler and implement in its leftwardly angled position.

Looking now to the plan views of FIGS. 5 and 6, there is illustrated the relationship between the PTO drive 74-76 and center line 88 as the implement 14 is swung right or left about its vertical pivot axis 42. As is apparent from FIGS. 5 and 6, the center lines 86 and 88 converge whereby interference would occur between the cylinder 50 and drive lines 74-76 were the cylinder 50 and drive line 74-76 not vertically separated a sufficient amount.

In operation, the coupler 12 can be utilized with either a PTO-driven implement, such as the broom which is illustrated, or it can be used with a non-driven implement, such as a blade which may require angling but not PTO driving power. In the latter event, the PTO drive line (that is the telescoping sleeve and spline shaft) can be supported on a bracket provided on the coupler 12 or disconnected and separated from the tractor 10.

Irrespective of which implement is used, the same implement coupler 12 can be used with both driven implements and non-driven implements and, accordingly, there is provided herein a single quick coupler capable of being utilized with such driven and non-driven implements, thereby minimizing the cost and time for the operator to utilize various implements with the same tractor and the need to change couplers or remove the angling cylinder when driven implements are used with the tractor.

We claim:

1. An improved quick-coupling device useable between an implement and a vehicle, wherein the implement has a driven shaft means that can be drivingly coupled with drive shaft means powered by the vehicle, said coupling device including:
   right and left side portions defining its general lateral width,
   means for permitting swinging movement of the device relative to the vehicle about a generally horizontal and laterally extending axis;
   means for pivotally mounting the implement to the device to permit swinging movement of the implement about a generally vertical axis;
   cylinder means carried by the device between its side portions, for swinging the implement about the vertical axis; and
   structural means mounting the cylinder means for operation, said mounting means being vertically spaced from the drive shaft means and driven shaft means when coupled, whereby the cylinder means can swing the implement about the vertical axis without contacting either shaft means.

2. The invention defined in claim 1 wherein the hydraulic cylinder means is carried below a center line extending through the driven shaft means when drivingly coupled to the drive shaft means.

3. The invention defined in claim 1 wherein a center line passing through the driven shaft means would, as viewed from above, converge with a center line passing through the cylinder means as the implement is swung about the vertical axis.

4. The invention defined in claim 1 wherein the horizontal axis for swinging the device is located vertically below the tractor drive shaft means and center lines taken through the driven shaft means and cylinder means are generally parallel when observed in a side view.

5. The invention defined in claim 1 wherein the cylinder means includes a hydraulic cylinder anchored at one end to the quick-coupling device and at its opposite end with the vehicle, both of said ends being located within the length of the coupled drive and driven shaft means.

6. An improved quick-coupling device useable between an implement and a vehicle, wherein the implement has a driven shaft means that can be drivingly coupled with drive shaft means powered by the vehicle, said coupling device including:

right and left side portions defining its general lateral width, means for permitting swinging movement of the device relative to the vehicle about a generally horizontal and laterally extending axis;

means for pivotally mounting the implement to the device to permit swinging movement of the implement about a vertical axis;

cylinder means carried by the device between its side portions, for swinging the implement about the vertical axis; and first and second anchoring means mounting the cylinder means for operation between the coupling device and the vehicle, the first anchoring means being between one end of the cylinder means and the device and located forwardly of the horizontal axis, the second anchoring means interconnecting the other end of the cylinder means with the implement and being located laterally spaced of the vertical axis, said first and second anchoring means being vertically spaced from the shaft means when coupled, whereby the cylinder means can swing the implement about the vertical axis without contacting either shaft means when said drive shaft means and said driven shaft means are coupled.

7. The invention defined in claim 6 wherein both anchored ends of the cylinder are located vertically below couplings of the drive and driven shafts.

8. A coupling device for mounting an implement having driven shaft means that can be drivingly coupled to a drive shaft means powered by a power take-off drive coupling of a tractor, said device including:

a frame structure having a pair of vertically spaced and horizontally extending plates, the plates being connected and including pivot means for permitting swinging movement of the frame structure about a horizontal and laterally extending axis;

means for mounting the implement to the device for permitting swinging movement of the implement about a vertical axis;

cylinder means for swinging the implement about the vertical axis;

structural means mounting the cylinder means between the pair of plates whereby there is no contact or interference with the driven shaft means when coupled to the drive shaft means the device is swung about its horizontal axis.

9. The invention defined in claim 8 wherein there is further provided hydraulic cylinder means for swinging the device about its horizontal axis.

10. The invention defined in claim 8 wherein the cylinder means includes a hydraulic cylinder anchored at one end to the coupling device and at its opposite end with the tractor, both of said ends being located between couplings between the power take-off drive shaft means and the driven shaft means of the implement.

11. An improved quick-coupling device useable between an implement and a vehicle, wherein the implement has a driven shaft means that can be drivingly coupled with drive shaft means powered by the vehicle, said coupling device including:

right and left side portions defining its general lateral width, a frame structure carried between the portions and including two spaced apart plate members, means for permitting swinging movement of the device relative to the vehicle about a generally horizontal and laterally extending axis;

means for pivotally mounting the implement to the device to permit swinging movement of the implement about a vertical axis;

cylinder means carried by the device between the spaced apart plate members for swinging the implement about the vertical axis; and structural means mounting the cylinder means for operation between the coupling device and the implement, said mounting means being vertically spaced from shaft means so that the drive shaft means can be drivingly coupled with the driven shaft means, and the cylinder means can swing the implement about the vertical axis, without contacting either shaft means when coupled.

* * * * *